US012355232B2

(12) United States Patent
Wortberg

(10) Patent No.: US 12,355,232 B2
(45) Date of Patent: Jul. 8, 2025

(54) ELECTRONIC POWER DISTRIBUTION ARRANGEMENT FOR FUSING CAPACITIVE LOADS

(71) Applicant: Lisa Draexlmaier GmbH, Vilsbiburg (DE)

(72) Inventor: Michael Wortberg, Dorfen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 332 days.

(21) Appl. No.: 17/748,281

(22) Filed: May 19, 2022

(65) Prior Publication Data

US 2022/0376488 A1 Nov. 24, 2022

(30) Foreign Application Priority Data

May 19, 2021 (DE) .................... 10 2021 112 935.4

(51) Int. Cl.
*H02H 7/16* (2006.01)
*H02H 1/00* (2006.01)

(52) U.S. Cl.
CPC ............ *H02H 7/16* (2013.01); *H02H 1/0007* (2013.01)

(58) Field of Classification Search
CPC ...... H02H 7/16; H02H 1/0007; H02H 11/005; H02H 1/043; H02H 3/087; H02H 9/001; H02H 3/08
See application file for complete search history.

(56) References Cited

U.S. PATENT DOCUMENTS

| 9,312,689 B2 * | 4/2016 | Nisonen | H02J 4/00 |
| 2013/0140890 A1 * | 6/2013 | Nisonen | H02H 9/025 361/57 |
| 2018/0272870 A1 * | 9/2018 | Burkman | H02H 9/001 |
| 2022/0376486 A1 * | 11/2022 | Wortberg | H02H 3/24 |

FOREIGN PATENT DOCUMENTS

| DE | 102015100796 A1 | 7/2015 | |
| DE | 102021112934 A1 * | 11/2022 | ....... G01R 19/16571 |
| EP | 2602894 A1 * | 6/2013 | ............... H02H 3/08 |

OTHER PUBLICATIONS

Abstract of DE102015100796A1 machine translation into English.
Office Action for DE102021112935 in German.
Office Action for DE102021112935 in English.

* cited by examiner

*Primary Examiner* — Jared Fureman
*Assistant Examiner* — Nicolas Bellido
(74) *Attorney, Agent, or Firm* — BelayIP

(57) ABSTRACT

An electronic power distribution arrangement is disclosed which includes an electrical line for supplying power to a capacitive load; a first electronic switch for fusing the capacitive load; a second electronic switch for precharging the capacitive load prior to switching through the first electronic switch; a resistor connected in series with the second switchable current path of the second electronic switch, the series connection being connected in parallel with the first switchable current path of the first electronic switch; and a controller. The controller is adapted to turn on the second electronic switch to precharge the capacitive load before turning on the first electronic switch to supply power to the capacitive load, and to turn on the first electronic switch only when a voltage across the resistor reaches a threshold value.

13 Claims, 11 Drawing Sheets

ELECTRONIC POWER DISTRIBUTION ARRANGEMENT FOR FUSING CAPACITIVE LOADS

CROSS REFERENCE TO RELATED APPLICATIONS

This application claims priority to German patent application 10 2021 112 935.4, filed May 19, 2021, the content of which is herein incorporated by reference.

BACKGROUND OF THE INVENTION

Field of the Invention

The disclosure relates to electronic power distribution arrangements for fusing a capacitive load and methods for fusing a capacitive load, for example for fusing capacitive loads in vehicles. In particular, the disclosure relates to an inrush circuit and control for switching into capacitive loads.

Description of Related Art

Electronic power distributors, used for example in the automotive sector, must protect a large number of load paths. Electronic fusing is necessary because of the safety implication of the supply. Conventional fuses are very slow-blowing and therefore do not allow reaction-free disconnection of faults. However, switching on capacitive loads is problematic. When the on-board voltage is switched to the input capacitance of the loads, very large inrush currents are generated. These can exceed the threshold for fast short-circuit disconnection. As a consequence, the MOSFET is switched off again immediately when switching into the capacitive load.

BRIEF SUMMARY OF THE INVENTION

It is an object of the present invention to provide a concept for a reliable power-on circuit and control in which the switching-on of the power supply is stable. In particular, it is an object of the invention to provide a reliable power-on circuit and control in which there is no permanent switching on and off of the power supply due to a repeated response of the short-circuit disconnection during the power-on process.

The disclosure is based on the idea of briefly (e.g. for 2 ms) charging the capacitive load to, for example, 2V via an additional (small) MOSFET ("bypass MOSFET") when the on-board power supply voltage is switched on. After the 2 ms the voltage at the load is measured. If this is greater than 2V, then there is no short circuit of the load. Then the fast short-circuit shutdown of the MOSFET can be switched off by the controller and the MOSFET can be driven fully through. The voltage at the load then rises very quickly to 12V.

Power distribution arrangements are described in this disclosure. A power distribution arrangement is an arrangement of one or more power distributors and further electronic components, such as one or more electronic switches and a controller.

A power distribution board is a device or arrangement, e.g., on a printed circuit board, in which fuse and switching elements are housed for the distribution of electrical power, primarily in the area of the low-voltage network. It is located in virtually every electrified vehicle or building. Electrical lines lead from power distributors either directly to the points of consumption, for example to the sensors, the fan, or the interior lighting in the motor vehicle, or to a junction box for a household appliance, to a socket, to a lighting fixture in the building or to the next subordinate power distributor.

In this disclosure, electronic switches are described. An electronic switch, also called an analog switch or semiconductor switch, is a component of an electronic circuit that realizes the function of an electromechanical switch. Field-effect transistors (FETs), e.g., metal-oxide-semiconductor FETs, and bipolar transistors, as well as diodes, may be used as switching elements. In a broader sense, thyristors and semiconductor relays can also be used as electronic switches.

In this disclosure, metal-oxide-semiconductor field-effect transistors are described. A metal-oxide-semiconductor field-effect transistor (MOSFET) is an insulated-gate field-effect transistor design characterized by a layer stack of a metallic gate electrode, a semiconductor, and the intervening oxide dielectric. This represents a metal-insulator-semiconductor structure. The current flow in the semiconductor area between the two electrical terminals drain and source is controlled by a control voltage (gate-source voltage) or control potential (gate potential) at a third terminal, the so-called gate. This is electrically isolated from the semiconductor (and thus from the drain and source) by a dielectric.

According to a first aspect, the problem is solved by an electronic power distribution arrangement, comprising: an electrical line for supplying power to a capacitive load; a first electronic switch for fusing the capacitive load, the first electronic switch having a first switchable current path between a first load terminal and a second load terminal of the first electronic switch, the electrical line being connected to the first load terminal of the first electronic switch, and the second load terminal of the first electronic switch being connectable to a power supply to supply power to the capacitive load; a second electronic switch for precharging the capacitive load prior to switching through the first electronic switch, the second electronic switch having a second switchable current path between a first load terminal and a second load terminal of the second electronic switch, a resistor connected in series with the second switchable current path of the second electronic switch, the series connection of the resistor with the second electronic switch being connected in parallel with the first switchable current path of the first electronic switch and a controller for controlling the first electronic switch and the second electronic switch, the controller being adapted to turn on the second electronic switch to precharge the capacitive load prior to turning on the first electronic switch to power the capacitive load and to turn on the first electronic switch only when a voltage across the resistor reaches a threshold value.

Such an electronic power distribution arrangement provides reliable and stable power supply turn-on. The electronic power distribution arrangement provides reliable power-on switching and control, in which there is no continuous switching on and off of the power supply due to a repeated response of the short-circuit disconnection during the power-on process. This greatly reduces stress on the circuit components and allows the power distribution arrangement to operate stably and conserve resources.

According to an exemplary embodiment of the electronic power distribution arrangement, the controller is configured to precharge the capacitive load via an electrical bypass path from the power supply via the second switchable current path of the second electronic switch and the resistor to the capacitive load.

This has a technical advantage that this bypass path can be used to test whether the capacitive load is holding a state of charge or whether there is a short circuit where the state of charge cannot be held. It can thus be efficiently determined whether there is a short circuit in the load path.

According to an exemplary embodiment of the electronic power distribution arrangement, the threshold value of the voltage across the resistor is above a voltage that occurs when the capacitive load across the resistor is short-circuited.

This has a technical advantage that, with such a choice of voltage threshold, it can be reliably detected whether there is a short circuit in the load path.

According to an exemplary embodiment of the electronic power distribution arrangement, the controller is configured to disable a short-circuit disconnection of the first electronic switch when the first electronic switch is switched through.

This has a technical advantage that in the event that there is no short circuit, the short-circuit disconnection can be switched off to allow the load to be switched on hard and thus accelerate the starting process.

According to an exemplary embodiment of the electronic power distribution arrangement, the short-circuit shutdown of the first electronic switch is implemented in the controller and configured to turn off the first electronic switch when a current through the first switchable current path of the first electronic switch reaches a shutdown threshold.

This provides a technical advantage that the electronic power distribution arrangement complies with the relevant safety regulations, according to which, in the event of a short circuit, the load is quickly and efficiently disconnected from the power supply.

According to an exemplary embodiment of the electronic current distribution arrangement, the controller is configured to allow a current flow through the first switchable current path that is above the switch-off threshold when the first electronic switch is switched through.

This has a technical advantage that, in the absence of a short circuit, the electronic power distribution arrangement enables the load to be switched on quickly and safely.

According to an exemplary embodiment of the electronic power distribution arrangement, the controller is configured to detect the voltage across the resistor after a predetermined time has elapsed from the time the second electronic switch is turned on.

This has a technical advantage of allowing the second electronic switch to test the precharge state of the capacitive load. After the predetermined time, the capacitive load should have assumed a specifiable precharge state if there is no short circuit in the load path.

According to an exemplary embodiment of the electronic power distribution arrangement, the controller is configured to maintain the first electronic switch in the off state when the voltage across the resistor remains below the threshold voltage after the predetermined time has elapsed.

This has a technical advantage that the voltage across the resistor can be used to test whether the load path is in short circuit, namely by checking the voltage across the resistor.

According to an exemplary embodiment of the electronic power distribution arrangement, the threshold voltage is below a start-up voltage of a voltage regulator of the capacitive load.

This has a technical advantage that it is easy to determine whether there is a short circuit by comparing it with the start-up voltage.

According to an exemplary embodiment of the electronic power distribution arrangement, the first electronic switch and/or the second electronic switch comprises a MOSFET transistor.

This achieves a technical advantage that such an electronic power distribution arrangement is particularly easy to implement with MOSFETs, since MOSFET transistors are standard components that are available at low cost.

According to an exemplary embodiment of the electronic power distribution arrangement, the controller comprises an application specific integrated circuit, ASIC, in particular an electrical fuse ASIC, eFASic.

This achieves a technical advantage that control via ASICs has a fast response time and is easy to program and also to reprogram.

According to an exemplary embodiment of the electronic power distribution arrangement, the controller is configured to control a connection of an on-board power supply voltage to the capacitive load based on a control of the first electronic switch and the second electronic switch.

This achieves a technical advantage that such an electronic power distribution arrangement efficiently prevents the repeated switching on and off of the power supply, thus stably switching on the load.

According to a second aspect, the problem is solved by an electronic power distribution arrangement, comprising: an electrical line for supplying power to a capacitive load; an electronic switch for fusing the capacitive load, the electronic switch having a switchable current path between a first load terminal and a second load terminal, the electrical line being connected to the first load terminal, and the second load terminal being connectable to a power supply for supplying power to the capacitive load; and a controller for controlling the electronic switch, the controller comprising a short-circuit turn-off circuit adapted to turn off the electronic switch when a current through the switchable current path of the electronic switch reaches a turn-off threshold and to turn on the electronic switch again after the turn-off, thereby charging the capacitive load in a stepwise manner, wherein the controller is adapted to detect a voltage across the capacitive load and to turn on the electronic switch when the detected voltage across the capacitive load reaches a threshold.

Such an electronic power distribution arrangement provides reliable and stable power supply turn-on. The electronic power distribution arrangement provides reliable power-on switching and control, where stress on the circuit components is greatly reduced. Compared to the electronic power distribution arrangement according to the first aspect, additional electronic components are saved here, such as the second electronic switch and the resistor.

According to an exemplary embodiment of the electronic power distribution arrangement according to the second aspect, the controller is configured to switch on the electronic switch again after a predetermined time after the switch-off threshold of the electronic switch has been reached.

This has a technical advantage of pre-charging the capacitive load step by step to test whether or not there is a short circuit in the load path.

According to an exemplary embodiment of the electronic power distribution arrangement according to the second aspect, the threshold of the voltage across the capacitive load is above a voltage across the capacitive load that occurs when there is a short circuit across the capacitive load.

This has a technical advantage of efficiently detecting whether there is a short circuit in the load path.

According to an exemplary embodiment of the electronic power distribution arrangement according to the second aspect, the controller is configured to turn off the short circuit disconnection of the electronic switch when the electronic switch is switched through.

This has a technical advantage that if there is no short circuit in the load path, the load can be connected very quickly, i.e., connected to the power supply.

According to a third aspect, the problem is solved by a method for fusing a capacitive load connected via an electrical line to an electronic power distribution arrangement comprising: a first electronic switch having a first switchable current path between a first load terminal and a second load terminal of the first electronic switch, wherein the electrical line is connected to the first terminal of the first electronic switch, and wherein the second terminal of the first electronic switch is connected to a power supply for supplying power to the capacitive load; a second electronic switch having a second switchable current path between a first load terminal and a second load terminal of the second electronic switch; a resistor connected in series with the second switchable current path of the second electronic switch, the series connection of the resistor with the second electronic switch being connected in parallel with the first switchable current path of the first electronic switch; the method comprising the steps of: turning on the second electronic switch to precharge the capacitive load prior to turning on the first electronic switch; sensing a voltage across the resistor; and turning on the first electronic switch when the sensed voltage across the resistor reaches a threshold value.

Such a method provides reliable and stable power supply turn-on. The method provides reliable power-on switching and control, in which there is no continuous power-on and power-off due to repeated short-circuit shutdown response during power-on operation. This greatly reduces the stress on the circuit components and results in stable operation that conserves resources.

According to a fourth aspect, the problem is solved by a method for fusing a capacitive load connected via an electrical line to an electronic power distribution arrangement comprising: an electronic switch having a switchable current path between a first load terminal and a second load terminal, wherein the electrical line is connected to the first load terminal, and wherein the second load terminal is connected to the power supply for supplying current to the capacitive load; the method comprising the steps of: incrementally turning off the first electronic switch when a current through the switchable current path of the electronic switch reaches a turn-off threshold, and turning on the electronic switch again after the turn-off to charge the capacitive load incrementally; sensing a voltage across the capacitive load; and turning on the electronic switch when the sensed voltage across the capacitive load reaches a threshold.

Such a method provides reliable and stable power supply turn-on. The method provides reliable power-on switching and control, where stress to the circuit components is greatly reduced. Compared to the method according to the third aspect, additional electronic components are saved here, such as the second electronic switch and the resistor.

According to a fifth aspect of the invention, the task is solved by a computer program comprising a program code for executing the method according to the third or fourth aspect on a controller, in particular a controller of an electronic power distribution arrangement according to the first or second aspect.

This provides a technical advantage that the computer program can be easily executed on a controller.

BRIEF DESCRIPTION OF THE SEVERAL VIEWS OF THE DRAWINGS

Further advantages, features, and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, without departing from the scope of the disclosure.

The present invention is described in more detail below with reference to examples of embodiments and the figures, wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

In the following detailed description, reference is made to the accompanying drawings, which form a part hereof and in which are shown, by way of illustration, specific embodiments in which the invention may be carried out. It is understood that other embodiments may be used, and structural or logical changes may be made without departing from the concept of the present invention. Therefore, the following detailed description is not to be understood in a limiting sense. It is further understood that the features of the various embodiments described herein may be combined, unless otherwise specifically indicated.

The aspects and embodiments are described with reference to the drawings, where like reference signs generally refer to like elements. In the following description, for purposes of explanation, numerous specific details are set forth to provide a thorough understanding of one or more aspects of the invention. However, it may be apparent to one skilled in the art that one or more aspects or embodiments may be embodied with a lesser degree of specific detail. In other instances, known structures and elements are shown in schematic form to facilitate description of one or more aspects or embodiments. It will be understood that other embodiments may be used, and structural or logical changes may be made without departing from the concept of the present invention.

Figure 1:
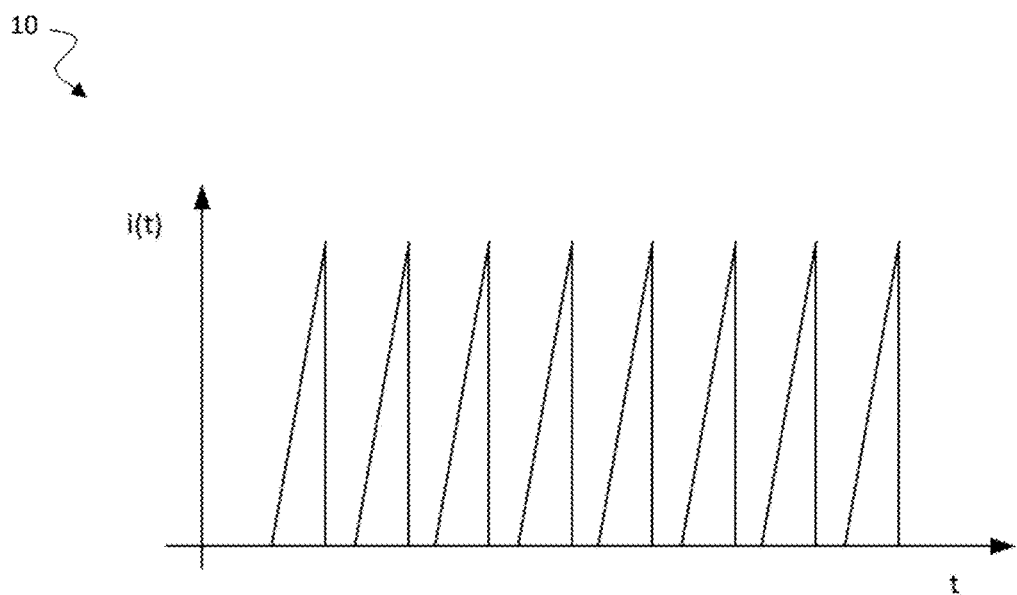
FIG. 1 depicts a schematic diagram of the current curve when a capacitive load is connected to the on-board power supply with repeated connection of the electronic switch.

FIG. 1 depicts a schematic diagram of the current curve 10 when a capacitive load is connected to the on-board power supply with repeated connection of the electronic switch.

The current trace 10 shows a number of successive current ramps over time. In this example, eight successive current ramps are shown. The number can also typically be several hundred or thousand.

During the current switching process, also known as "inrush", in which the load is switched to the on-board power supply, the load is immediately switched back on again after it has been switched off via the fast short-circuit disconnection. With each switching operation, a partial charge is loaded onto the capacity of the load. Thus, the voltage across the capacitor of the load slowly increases.

Smart FETs typically have such a mechanism, in which the capacitance of the load is gradually charged by steady reconnection to the capacitive load.

The current rise i(t) in the capacitive load shown in FIG. 1 is limited by the inductance of the lines. If the switch-off threshold of the MOSFET driver is reached, the MOSFET switches off. This is followed by an immediate restart. With each i(t) triangle, charge is applied to the capacitance and the voltage increases in steps.

Figure 2:
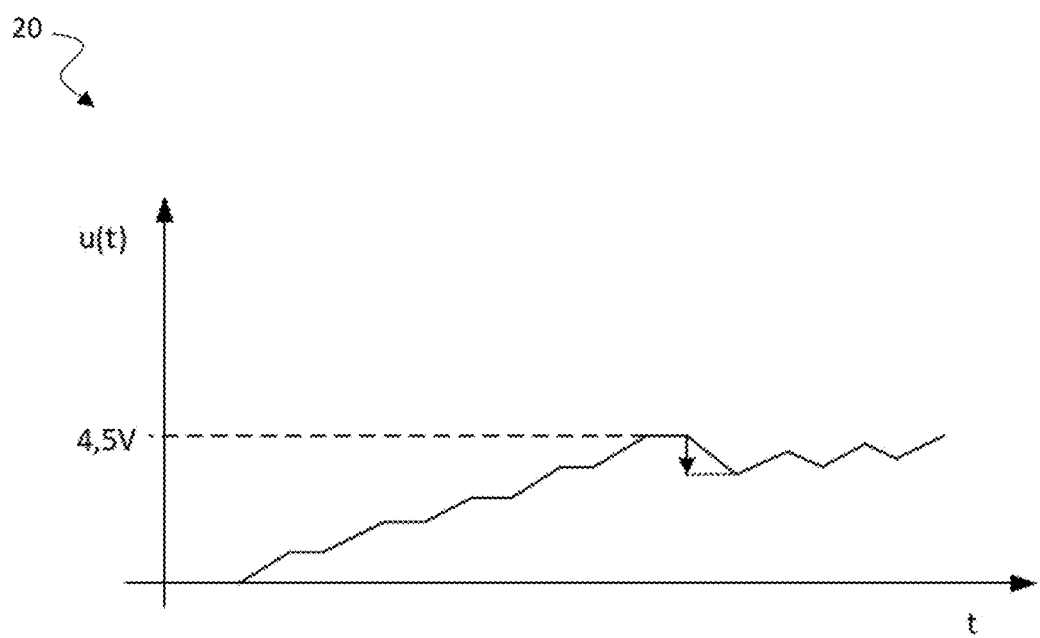
FIG. 2 depicts a schematic diagram of the voltage curve at the capacitive load when the capacitive load is connected to the vehicle electrical system voltage with repeated connection of the electronic switch, without hard switching after a threshold voltage is reached.

FIG. 2 depicts a schematic diagram of the voltage curve 20 at the capacitive load when the capacitive load is connected to the vehicle electrical system voltage with repeated connection of the electronic switch, without hard switching after a threshold voltage is reached.

FIG. 2 further depicts how the voltage u(t) at the capacitive load increases with each switch-on, as shown in FIG. 1. At about 4.5V to 5.5V, the µcontroller of the load starts to ramp up because the start voltage of the voltage regulator is exceeded. At this moment, however, the capacitance is loaded by the µcontroller and the load itself. As a consequence, the voltage of the capacitance decreases. This can again fall below the operating voltage of the controller. Thus, depending on the behavior of the load, an unstable start-up of the load including the µcontroller can occur. The unstable start-up (brown-in) can lead to an unspecified behavior of the load and thus to errors which are difficult to identify, and which can also only occur sporadically.

Figure 3:
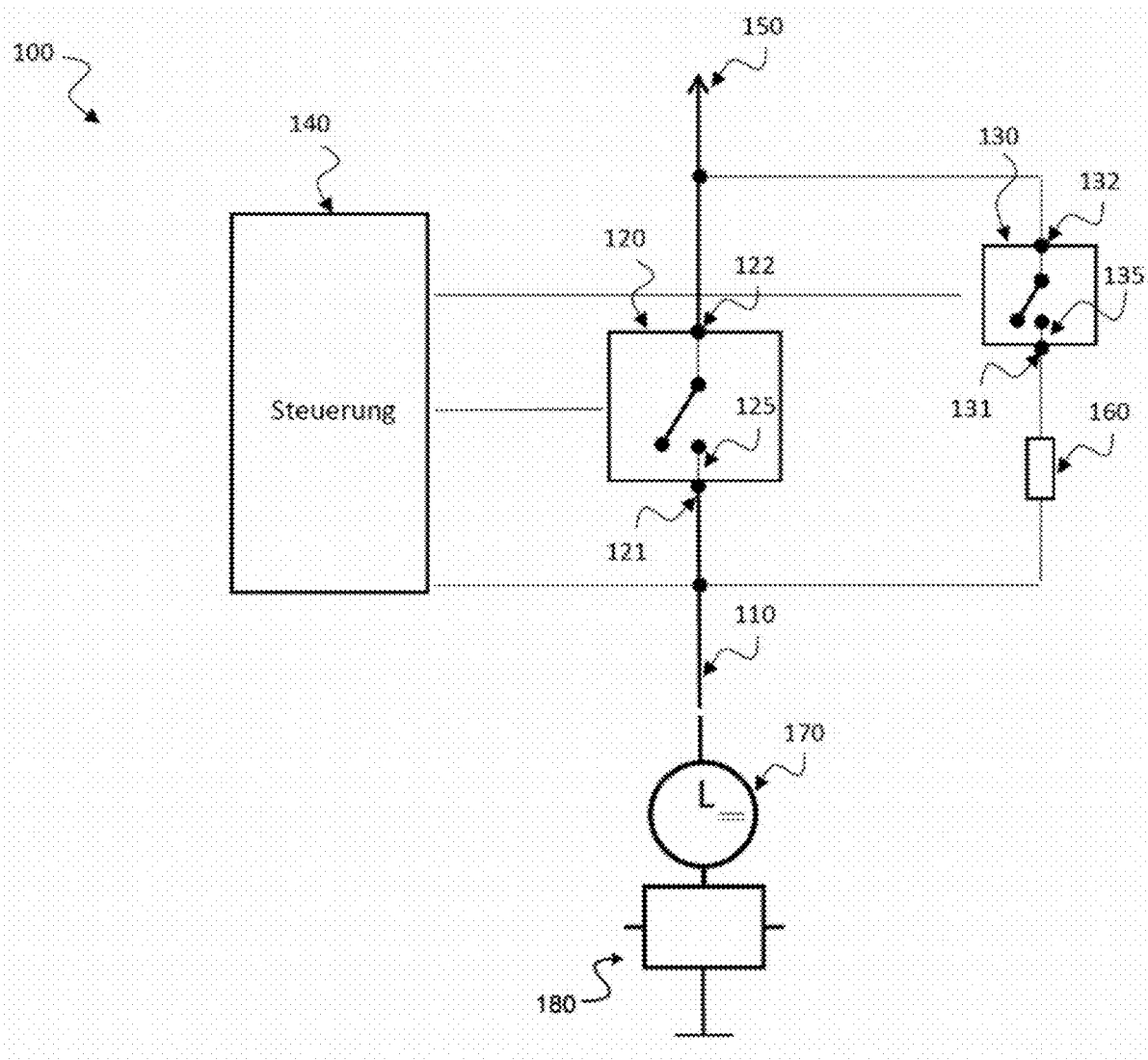
FIG. 3 depicts a schematic illustration of an electronic power distribution arrangement 100 according to a first aspect of the disclosure.

FIG. 3 depicts a schematic diagram of an electronic power distribution arrangement 100 according to a first aspect of the disclosure.

The electronic power distribution arrangement 100 is for fusing a capacitive load 170. The electronic power distribution arrangement 100 includes an electrical line 110 for supplying power to the capacitive load 170; a first electronic switch 120 for fusing the capacitive load 170; a second electronic switch 130 for precharging the capacitive load 170; a resistor 160; and a controller 140.

The first electronic switch 120 has a first switchable current path 125 between a first load terminal 121 and a second load terminal 122 of the first electronic switch 120. The electrical line 110 is connected to the first load terminal 121 of the first electronic switch 120. The second load terminal 122 of the first electronic switch 120 is connectable to a power supply 150, such as the electrical system of an electrified vehicle, to supply power to the capacitive load 170.

The second electronic switch 130 is for precharging the capacitive load 170 prior to a switching through of the first electronic switch 120. The second electronic switch 130 includes a second switchable current path 135 between a first load terminal 131 and a second load terminal 132 of the second electronic switch 130.

The resistor 160 is connected in series with the second switchable current path 135 of the second electronic switch 130. The series connection of the resistor 160 to the second electronic switch 130 is connected in parallel with the first switchable current path 125 of the first electronic switch 120.

The controller 140 is used to control the first electronic switch 120 and the second electronic switch 130.

The controller 140 is configured to turn on the second electronic switch 130 to precharge the capacitive load 170 before turning on the first electronic switch 120 to supply power to the capacitive load 170, and to turn on the first electronic switch 120 only when a voltage across the resistor 160 reaches a threshold value.

For example, the controller 140 is configured to precharge the capacitive load 170 via an electrical bypass path from the power supply 150 through the second switchable current path 135 of the second electronic switch 130 and the resistor 160 to the capacitive load 170.

For example, the threshold voltage across the resistor 160 is above a voltage that occurs when the capacitive load 170 shorts across the resistor 160.

For example, the controller 140 is configured to disable a short circuit shutdown of the first electronic switch 120 when the first electronic switch 120 is switched through.

The short-circuit shutdown of the first electronic switch 120 is implemented in the controller 140, for example, and may be configured to shut down the first electronic switch 120 when a current through the first switchable current path 125 of the first electronic switch 120 reaches a shutdown threshold, for example, in accordance with the current and voltage waveforms shown above with respect to FIGS. 1 and 2.

Figure 5A:
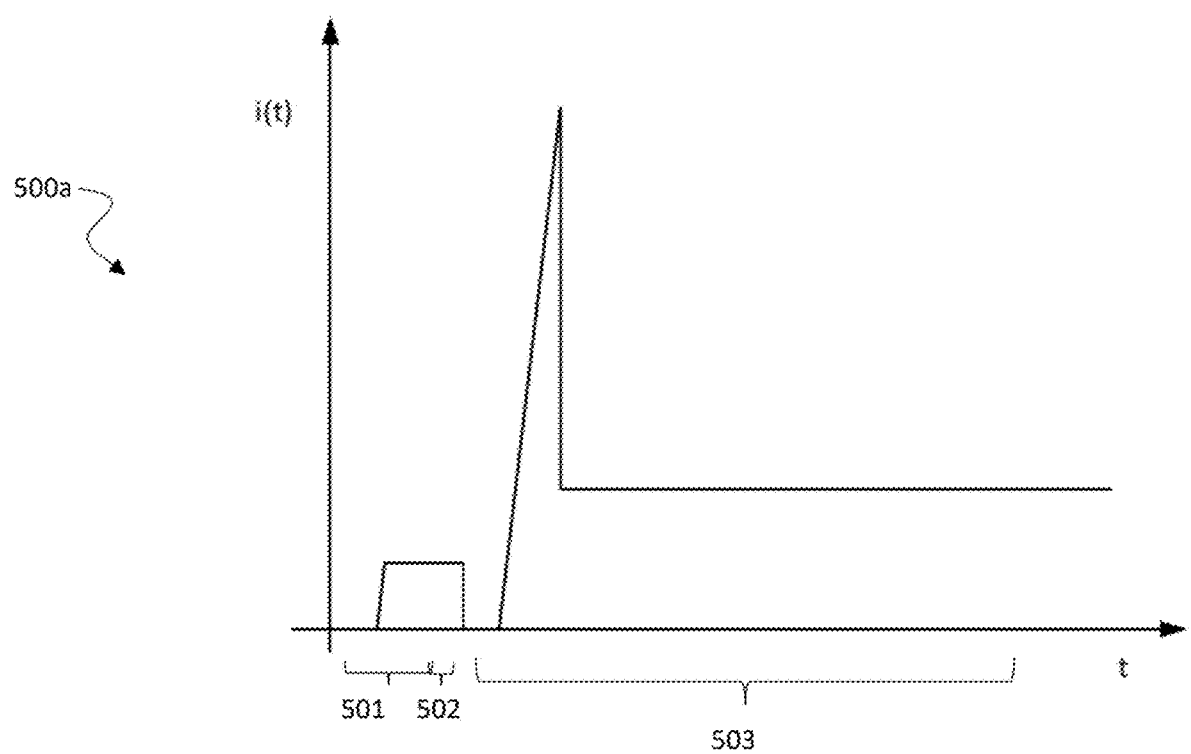
FIG. 5A depicts a schematic representation of the current waveform 500a across the capacitive load when the capacitive load is successfully connected across the electronic power distribution arrangement 200 without a short circuit in the load branch.

The controller 140 may be configured to allow a current flow through the first switchable current path 125 that is above the shutdown threshold when the first electronic switch 120 is switched on, such as shown in FIG. 5A.

The controller 140 may be configured to sense the voltage across the resistor 160 after a predetermined time has elapsed from when the second electronic switch 130 is turned on.

The controller 140 may be configured to maintain the first electronic switch 120 in the off state when the voltage across the resistor 160 remains below the voltage threshold after the predetermined time has elapsed.

For example, the threshold voltage may be below a start-up voltage of a voltage regulator 180 of the capacitive load 170.

Figure 4:
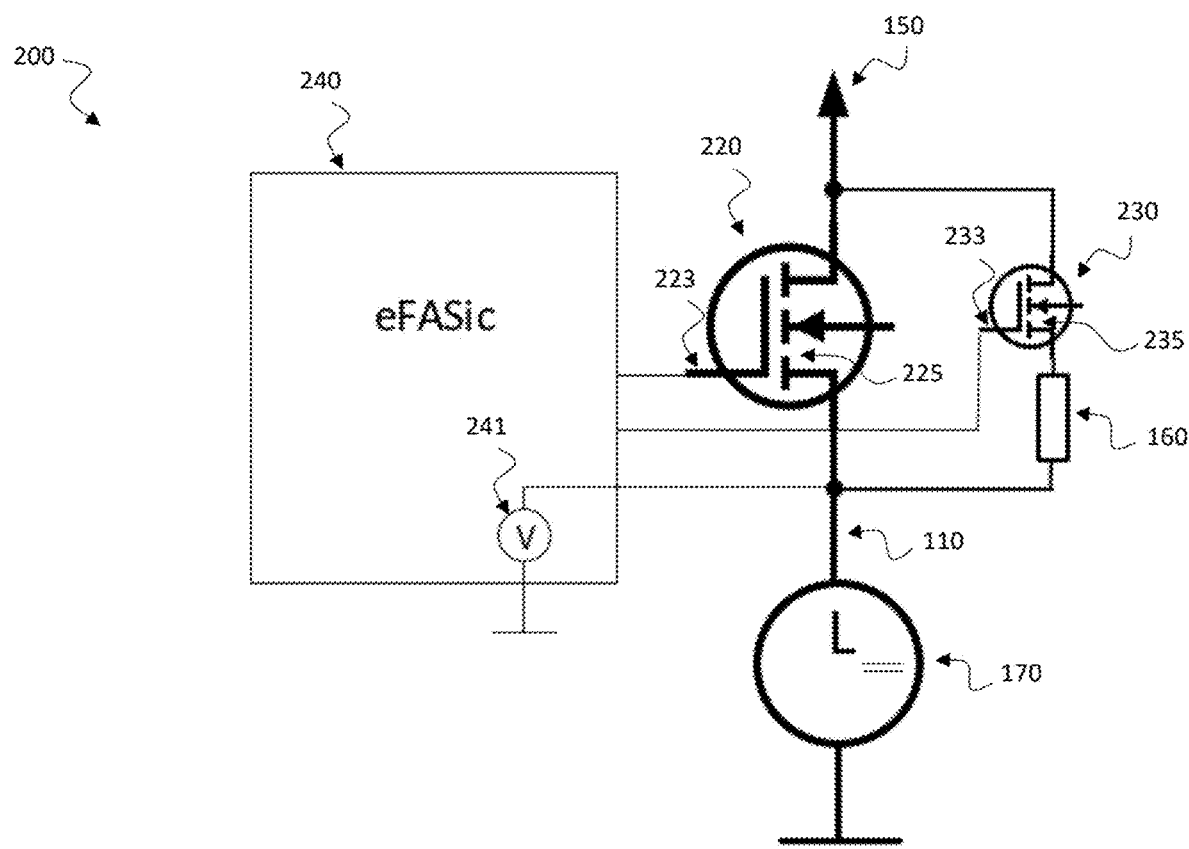
FIG. 4 depicts a schematic illustration of an embodiment of the electronic power distribution arrangement 200 according to the first aspect of the disclosure.

In one embodiment of the electronic power distribution arrangement 100 shown in more detail in FIG. 4, the first electronic switch 120 and/or the second electronic switch 130 comprises a MOSFET transistor 220, 230.

In one embodiment of the electronic power distribution arrangement 100, shown in more detail in FIG. 4, the controller 140 comprises an application specific integrated circuit (ASIC), such as an electrical fuse ASIC, also referred to herein as eFASic 240.

For example, the controller 140 is configured to control a connection of an on-board power supply voltage to the capacitive load 170 based on a control of the first electronic switch 120 and the second electronic switch 130.

FIG. 4 further depicts a schematic diagram of an embodiment of the electronic power distribution arrangement 200 according to the first aspect of the disclosure.

The electronic power distribution arrangement 200 is for fusing a capacitive load 170. The electronic power distribution arrangement 100 includes an electrical line 110 for supplying power to the capacitive load 170; a first electronic switch 120 for fusing the capacitive load 170, implemented in this embodiment as a first MOSFET 220; a second electronic switch 130 for precharging the capacitive load 170, implemented in this embodiment as a second MOSFET 230; a resistor 160; and a controller 140.

The first electronic switch 120 has a first switchable current path 225, e.g., n-channel or p-channel of the first MOSFET, between a first load terminal 121, e.g., drain or source, and a second load terminal 122, e.g., source or drain of the first MOSFET 220. The electrical line 110 is connected to the first load terminal 121 of the first MOSFET 220. The second load terminal 122 of the first MOSFET 220 is connectable to a power supply 150, such as the electrical system of an electrified vehicle, to supply power to the capacitive load 170.

The second MOSFET 230 is used to precharge the capacitive load 170 prior to a turn-on of the first MOSFET 220. The second MOSFET 230 includes a second switchable current path 235, e.g., n-channel or p-channel of the second MOSFET 230, between a first load terminal 131, e.g., drain or source, and a second load terminal 132, e.g., source or drain, of the second MOSFET 230.

The resistor 160 is connected in series with the second switchable current path 235 of the second MOSFET 230. The series connection of the resistor 160 to the second MOSFET 230 is connected in parallel with the first switchable current path 125 of the first MOSFET 220.

The controller 140 is used to control the first MOSFET 220 and the second MOSFET 230.

The controller 140 is configured to turn on the second MOSFET 230 to precharge the capacitive load 170 before turning on the first MOSFET 220 to power the capacitive load 170, and to turn on the first MOSFET 220 only when a voltage across the resistor 160 reaches a threshold value.

In this embodiment, the controller comprises an EFASic 242, i.e., an Electronic Fuse ASIC device, i.e., an ASIC (application specific integrated circuit) that implements an electronic fuse. The EFASic 242 can control the first MOSFET 220 and the second MOSFET 230 accordingly.

FIG. 5A depicts a schematic diagram of the current waveform 500a at the capacitive load when the capacitive load is successfully connected via the electronic power distribution arrangement 200 without a short circuit in the load branch.

In the representation of FIG. 5A, a current limited by a resistor 160 of e.g., 1.5 ohms flows to the capacitive load 170 for a short test period 501, e.g., 2 ms (see FIG. 4). The thermal load of the resistor remains low, because of the only short switching on. Also, the ballast resistor of the transistor 230 can be selected accordingly small, e.g., Rdson=10 mOhm. After this test period 501 of e.g., 2 ms, the voltage at the load 170 can be measured via the driver 241 of the eFASic 240. The measurement time 502 or measurement period 502 for measuring the voltage across the load is shown in the current trace 500a. If this voltage is above 0V, there is no short circuit of the load or the load circuit. The voltage threshold 510 to be reached in this process should be selected to be below the start-up voltage of the voltage regulators 180 of the load 170, e.g., 2V, as shown in the voltage trace 500b. When this voltage threshold 510 of, for example, 2V is reached, the fast short circuit shutdown of the driver 241 is disabled. Thereafter, i.e., for the time 503 or activation time 503, the switching MOSFET 220 is driven through by the driver 241.

Figure 5B:
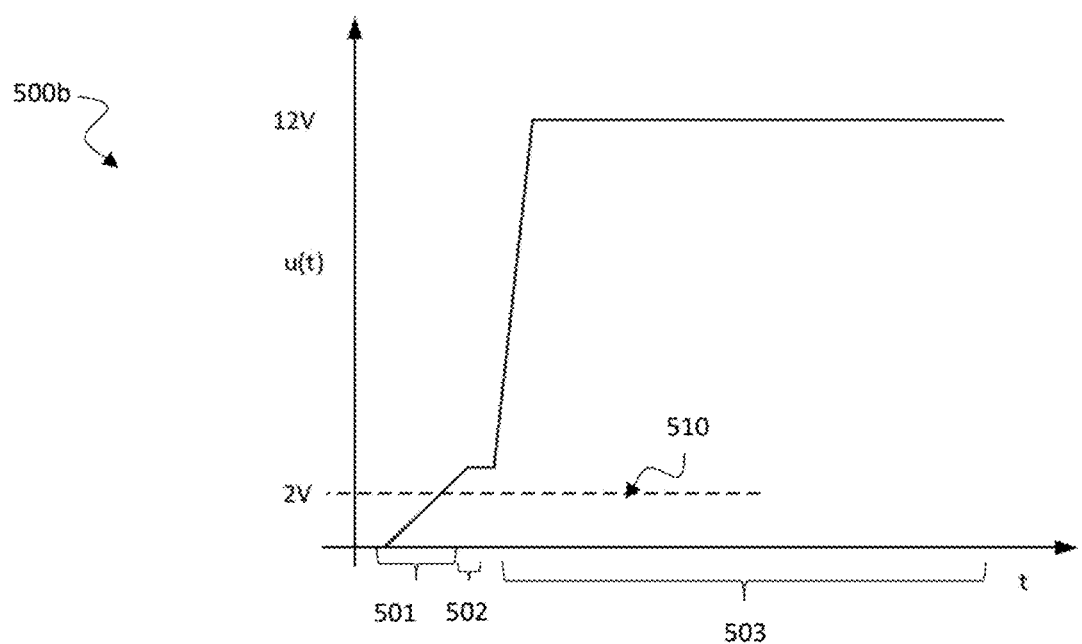
FIG. 5B depicts a schematic representation of the voltage waveform 500b across the capacitive load when the capacitive load is successfully connected across the electronic power distribution arrangement 200 without a short circuit in the load branch.

FIG. 5B depicts a schematic representation of the voltage characteristic 500b at the capacitive load for a successful connection of the capacitive load 170 via the electronic power distribution arrangement 200 without a short circuit in the load branch. The voltage waveform 500b and the corresponding current waveform 500a show the behavior with the described inrush control for a successful connection without a short circuit in the load branch. By means of the bypass branch via transistor 230 and resistor 160 (see FIG. 4), the capacitance of load 170 can be charged to a value corresponding to a voltage above voltage threshold 510 of, for example, 2V, since there is no short circuit which would prevent such charging of load 170. Thus, the fast overcurrent shutdown by the controller 240 can be disabled and the controller 240 can enable hard turn-on. In the current waveform 500a, the inrush current, or make-up current, rises to a high value that would otherwise have been prevented by the overcurrent shutdown, and the voltage rises rapidly to the on-board voltage of, for example, 12V, as shown in the voltage waveform 500b.

Figure 6A:
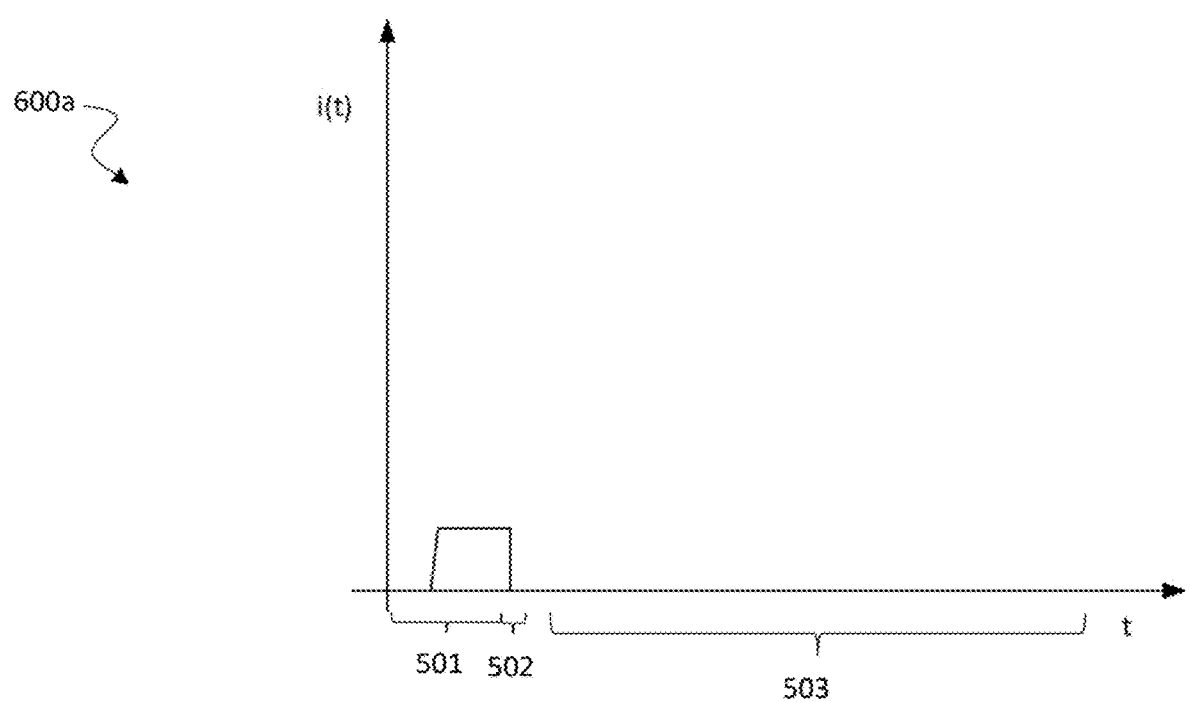
FIG. 6A depicts a schematic representation of the current waveform 600a at the capacitive load when the capacitive load is switched on via the electronic power distribution arrangement 200 for a short circuit in the load branch.

FIG. 6A depicts a schematic diagram of the current waveform 600a at the capacitive load when the capacitive load is switched on via the electronic power distribution arrangement 200 for a short circuit in the load branch or impermissibly low impedance of the load branch.

As described above for FIG. 4A, for a short test period 501, e.g., 2 ms, a current limited via the resistor 160 of e.g., 1.5 Ohm flows to the capacitive load 170 (see FIG. 4). After this test period 501 of e.g., 2 ms, the voltage at the load 170 can be measured via the driver 241 of the eFASic 240. The measurement time 502 for measuring the voltage at the load is shown in the current waveform 500a. If this voltage is below the previously described voltage threshold 510 of, for example, 2V, as shown in the voltage trace 600b, the controller 240 detects a short circuit in the load branch or an impermissibly low impedance of the load branch. Thus, the fast short-circuit disabling of the driver 241 is not disabled, but remains on, and in the following time interval 503 or the activation time 503, the switching MOSFET 220 is not driven through by the driver 241 but remains in the disabling state. Since no voltage builds up in the load branch due to the bypass charge, the switching transistor 220 is not hard cycled.

Figure 6B:
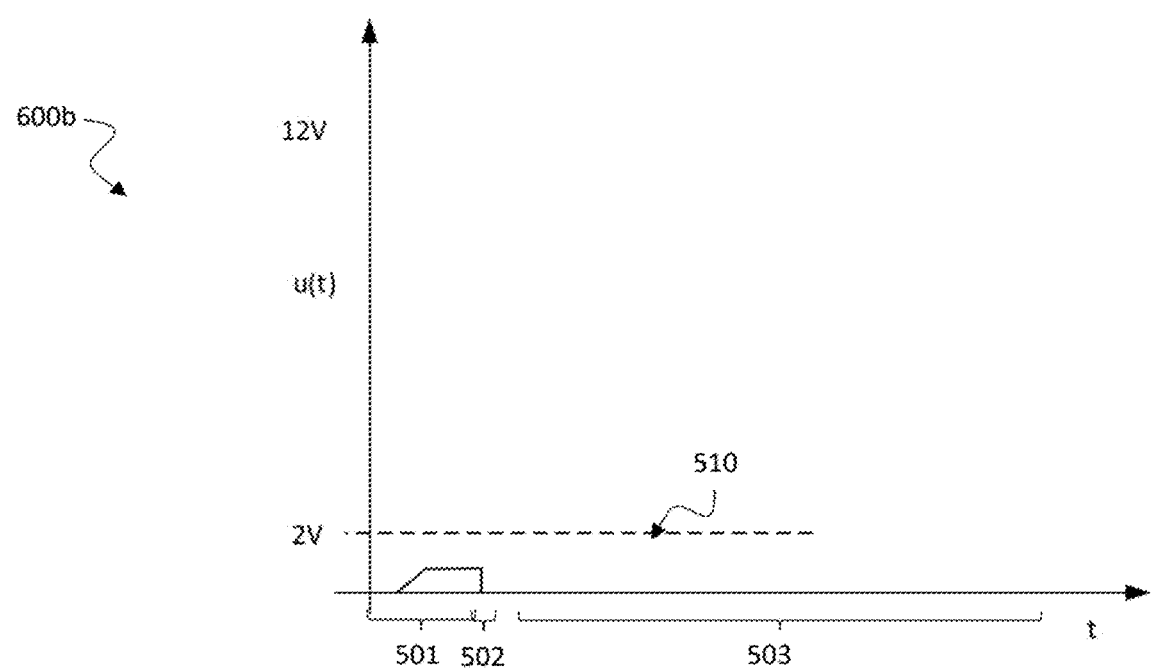
FIG. 6B depicts a schematic representation of the voltage waveform 600b across the capacitive load when the capacitive load is switched on via the electronic power distribution arrangement 200 for a short circuit in the load branch.

FIG. 6B depicts a schematic diagram of the voltage waveform 600b across the capacitive load when the capacitive load is connected across the electronic power distribution arrangement 200 for a short circuit in the load leg or impermissibly low impedance of the load leg.

The voltage waveform 600b and the corresponding current waveform 600a show the behavior in the described inrush control for a short circuit in the load branch or an impermissibly low impedance of the load branch. By using the bypass branch via transistor 230 and resistor 160 (see FIG. 4), the capacitance of load 170 can be charged to a value corresponding to a voltage above the voltage threshold 510 of, for example, 2V. However, since there is a short circuit, such charging of load 170 is prevented. Thus, the fast overcurrent shutdown by the controller 240 remains activated and a hard turn-on is prevented, which would result in an unstable condition due to the short circuit. In the current waveform 600a, the current remains at zero in the following time interval 510, as does the voltage in the voltage waveform 600b plot.

Figure 7:
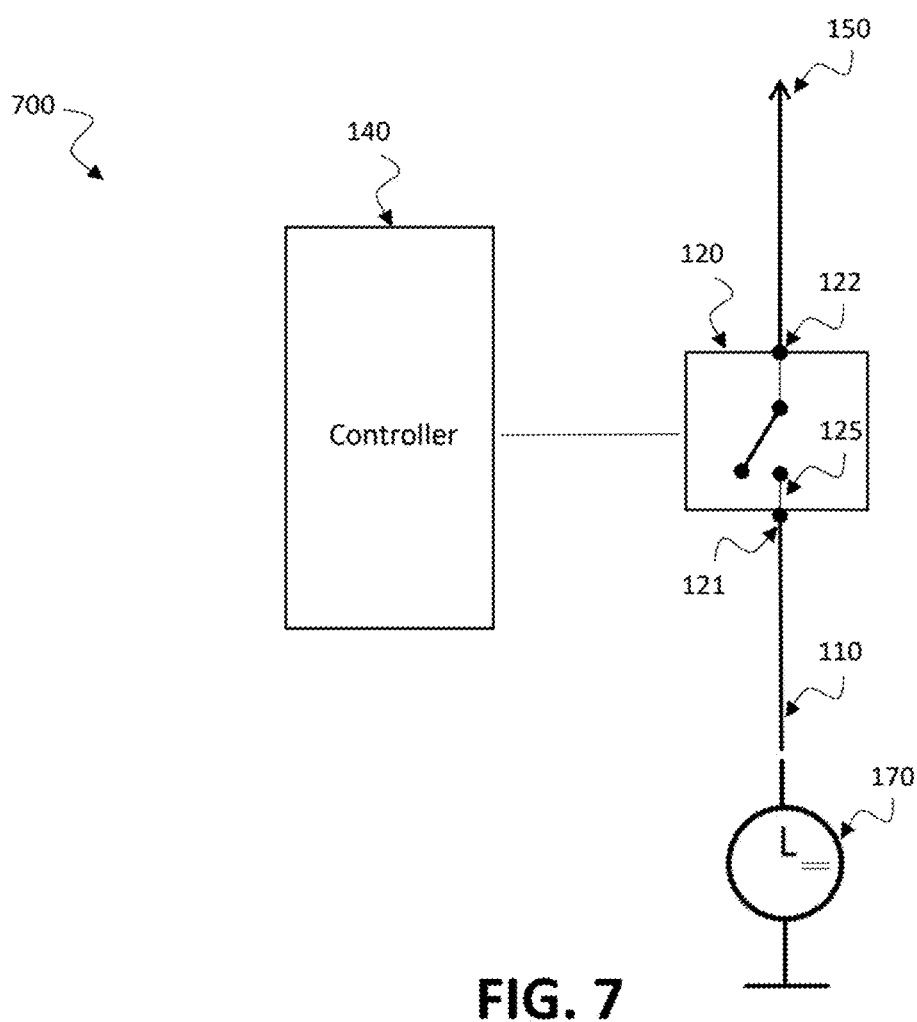
FIG. 7 depicts a schematic illustration of an electronic power distribution arrangement 700 according to a second aspect of the disclosure.

FIG. 7 depicts a schematic diagram of an electronic power distribution arrangement 700 according to a second aspect of the disclosure.

The electronic power distribution arrangement 700 is for fusing a capacitive load 170 and includes an electrical line 110 for supplying power to the capacitive load 170; an electronic switch 120 for fusing the capacitive load 170; and a controller 140 for controlling the electronic switch 120.

The electronic switch 120 includes a switchable current path 125 between a first load terminal 121 and a second load terminal 122. The electrical line 110 is connected to the first load terminal 121 and the second load terminal 122 is connectable to a power supply 150 to provide power to the capacitive load 170.

The controller 140 includes a short-circuit shutdown circuit configured to turn off the electronic switch 120 when a current through the switchable current path 125 of the electronic switch 120 reaches a shutdown threshold. The controller 140 is further configured to turn the electronic switch 120 back on after it is turned off, thereby charging the capacitive load 170 in a stepwise manner, for example, as shown by the voltage waveform in FIG. 2.

The controller 140 is configured to sense a voltage across the capacitive load 170 and to turn on the electronic switch 120 when the sensed voltage across the capacitive load 170 reaches a threshold value.

The controller 140 may be configured to turn the electronic switch 120 back on after a predetermined time after the electronic switch 120 reaches the turn-off threshold, thereby allowing the load 170 to be charged in stages.

The threshold voltage across capacitive load 170 may be selected to be above a voltage across capacitive load 170 that occurs when a short circuit occurs across capacitive load 170.

The controller 140 may be configured to disable the short circuit disconnect of the electronic switch 120 when the electronic switch 120 is cycled.

The behavior of the voltage waveform at the capacitive load is shown in FIG. 2. The voltage at the capacitive load 170 is gradually charged until a threshold value of, for example, 2V is reached, as described above for FIGS. 5A, 5B, 6A, and 6B. If this threshold is held for a subsequent measurement interval, it is detected that the capacitive load is not shorted. In this case, the short-circuit disconnect may be disabled and the controller 140 may enable a hard turn-on as described above with respect to FIGS. 5A, 5B, 6A, and 6B.

However, if this threshold cannot be maintained in the subsequent measurement interval, it is detected that the capacitive load is short-circuited. In this case, the short-circuit disconnection remains activated and the control 140 prevents the short-circuited capacitive load from being switched on and thus instabilities in the voltage and current curve.

Figure 8:
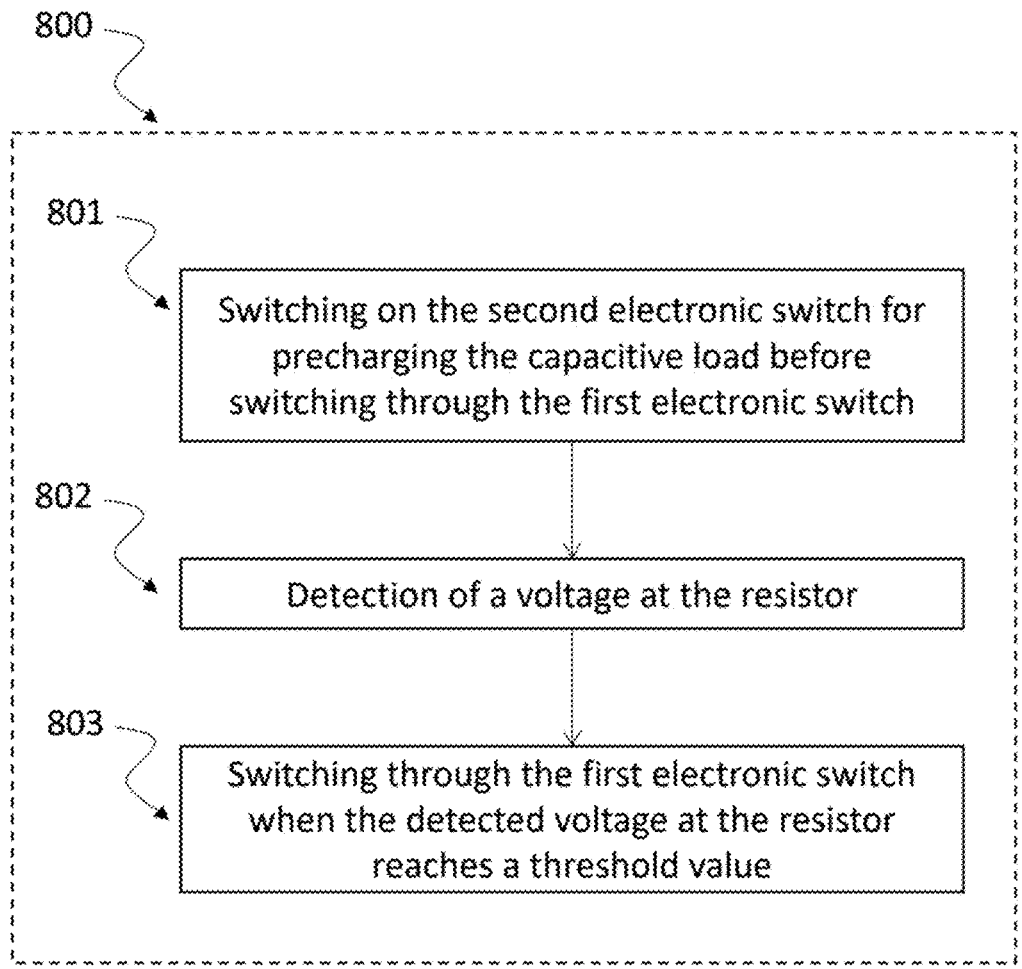
FIG. 8 depicts a schematic diagram of a method 800 for fusing a capacitive load according to a third aspect of the disclosure.

FIG. 8 depicts a schematic diagram of a method 800 for fusing a capacitive load according to a third aspect of the disclosure.

The method 800 is for fusing a capacitive load 170 connected via an electrical line 110 to an electronic power distribution arrangement 100, as described above with respect to FIGS. 3 and 4. Such an electronic power distribution arrangement 100 comprises: a first electronic switch 120 having a first switchable current path between a first load terminal and a second load terminal of the first electronic switch, wherein the electrical line is connected to the first terminal of the first electronic switch, and wherein the second terminal of the first electronic switch is connected to a power supply 150 to provide power to the capacitive load 170; a second electronic switch 130 having a second switchable current path between a first load terminal and a second load terminal of the second electronic switch; a resistor 160 connected in series with the second switchable current path 135 of the second electronic switch 130, wherein the series connection of the resistor 160 to the second electronic switch 130 is connected in parallel with the first switchable current path 125 of the first electronic switch 120.

The method 800 comprises the steps of: turning on 801 the second electronic switch 130 to precharge the capacitive load 120 prior to turning on the first electronic switch 120, such as described above with respect to FIGS. 3 and 4; sensing 802 a voltage across the resistor, such as described above with respect to FIGS. 3 and 4; and turning on 803 the first electronic switch 120 when the sensed voltage across the resistor reaches a threshold value, such as described above with respect to FIGS. 3 and 4.

Figure 9:
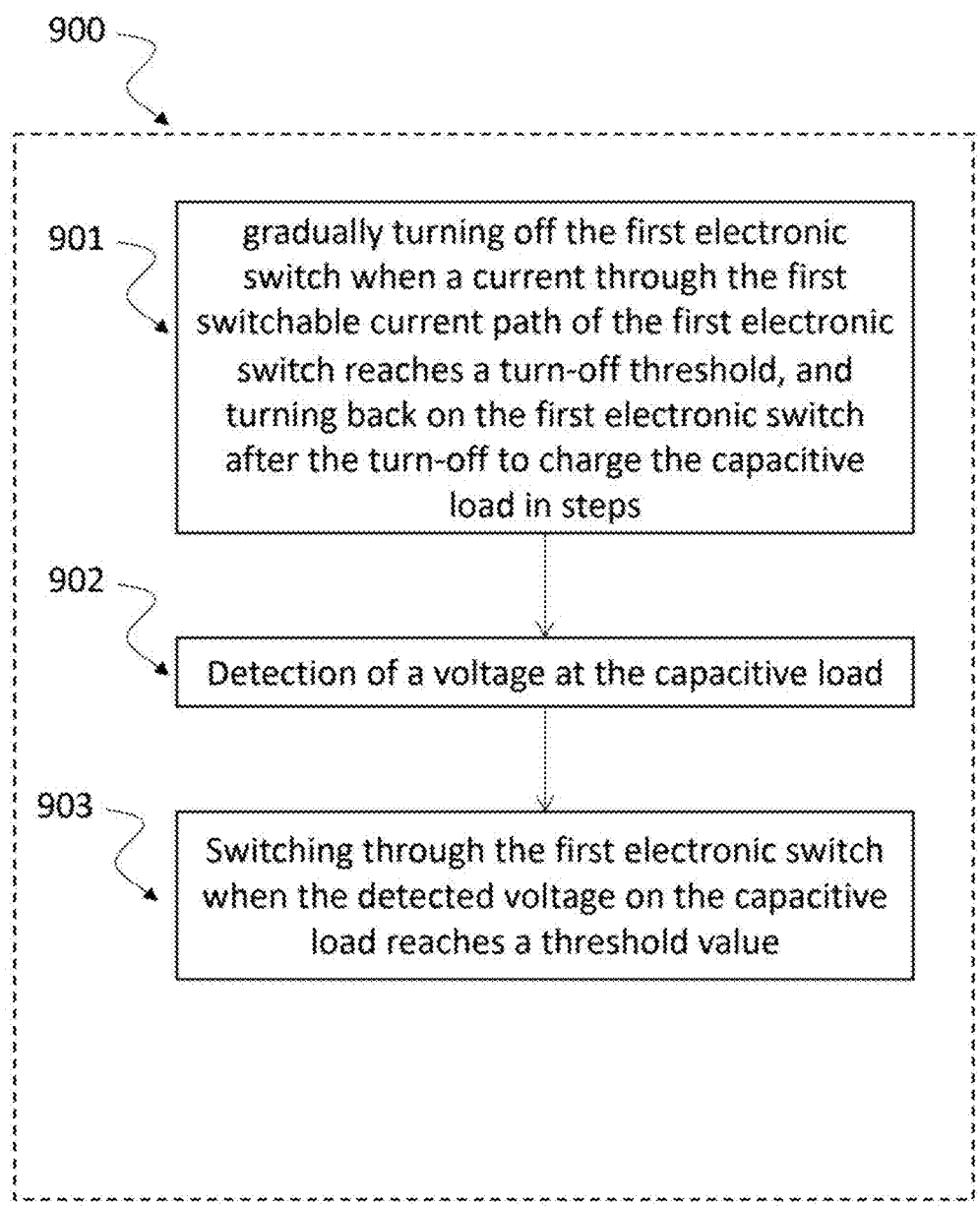
FIG. 9 depicts a schematic illustration of a method 900 for fusing a capacitive load according to a fourth aspect of the disclosure.

FIG. 9 depicts a schematic diagram of a method 900 for fusing a capacitive load according to a fourth aspect of the disclosure.

The method 900 is for fusing a capacitive load 170 connected via an electrical line 110 to an electronic power distribution arrangement 700, such as described above with respect to FIG. 7. This electronic power distribution arrangement 700 comprises: an electronic switch 120 having a switchable current path 125 between a first load terminal and a second load terminal, wherein the electrical line is connected to the first load terminal, and wherein the second load terminal is connected to the power supply to provide power to the capacitive load 170 as described above with respect to FIG. 7.

The method 900 comprises the steps of: incrementally turning off 901 the first electronic switch when a current through the switchable current path of the electronic switch reaches a turn-off threshold, and turning the electronic switch back on after the turn-off to incrementally charge the capacitive load, such as described above with respect to FIG. 7; sensing 902 a voltage across the capacitive load, such as described above with respect to FIG. 7; and turning on 903 the electronic switch when the sensed voltage across the capacitive load reaches a threshold, such as described above with respect to FIG. 7.

Further, a computer program including program code for executing methods 800, 900 in a controller, e.g., a controller 140 of an electronic power distribution arrangement 100, 200, 700 as described above with respect to FIGS. 3, 4, and 7, may be provided.

Some preferred embodiments of apparatus according to the invention have been disclosed above. The invention is not limited to the solutions explained above, but the innovative solutions can be applied in different ways within the limits set by the claims.

What is claimed is:

1. An electronic power distribution arrangement for fusing a capacitive load, the arrangement comprising:
    an electrical line configured to supply power to the capacitive load;
    a first electronic switch configured to fuse the capacitive load, the first electronic switch comprising a first switchable current path arranged between a first load terminal and a second load terminal of the first electronic switch, and wherein the electrical line is connected to the first load terminal of the first electronic switch, and wherein the second load terminal of the first electronic switch is connected to a power supply to supply power to the capacitive load;
    a second electronic switch configured to precharge the capacitive load prior to switching through the first electronic switch, the second electronic switch comprising a second switchable current path arranged between a first load terminal and a second load terminal of the second electronic switch,
    a resistor connected in series with the second switchable current path of the second electronic switch,
    a controller configured to control the first electronic switch and the second electronic switch,
    wherein the series connection of the resistor to the second electronic switch is connected in parallel with the first switchable current path of the first electronic switch, and
    wherein the controller is configured to turn on the second electronic switch to precharge the capacitive load before turning on the first electronic switch to supply power to the capacitive load, and to turn on the first electronic switch only when a voltage across the resistor reaches a threshold value.

2. The electronic power distribution arrangement according to claim 1, wherein the controller is further configured to precharge the capacitive load via an electrical bypass path from the power supply via the second switchable current path of the second electronic switch and the resistor to the capacitive load.

3. The electronic power distribution arrangement according to claim 1, wherein the threshold value of the voltage across the resistor is above a voltage that occurs when the capacitive load is short-circuited across the resistor.

4. The electronic power distribution arrangement according to claim 1, wherein the controller is further configured to disable a short-circuit disconnection of the first electronic switch when the first electronic switch is turned on.

5. The electronic power distribution arrangement according to claim 4, wherein the short circuit disconnection of the first electronic switch is configured to be implemented in the controller and is configured to shut down the first electronic switch when a current through the first switchable current path of the first electronic switch reaches a shutdown threshold.

6. The electronic power distribution arrangement according to claim 5, wherein the controller is configured to allow the current flow through the first switchable current path that is above the shutdown threshold when the first electronic switch is turned on.

7. The electronic power distribution arrangement according to claim 1, wherein the controller is further configured to detect the voltage across the resistor after a predetermined time has elapsed from when the second electronic switch is turned on.

8. The electronic power distribution arrangement according to claim 1, wherein the controller is adapted to maintain the first electronic switch in the off state when the voltage across the resistor remains below the threshold voltage after a predetermined time has elapsed.

9. The electronic power distribution arrangement according to claim 1, wherein the threshold value of the voltage is below a start-up voltage of a voltage regulator of the capacitive load.

10. The electronic power distribution arrangement according to claim 1, wherein at least one of the first electronic switch and the second electronic switch comprises a MOSFET transistor.

11. The electronic power distribution according to claim 1, wherein the controller comprises an application specific integrated circuit, ASIC, in particular an electrical fuse ASIC, eFASic.

12. The electronic power distribution arrangement according to claim 1, wherein the controller is configured to control a connection of an on-board power supply voltage to the capacitive load based on a control of the first electronic switch and the second electronic switch.

13. A method of fusing a capacitive load connected via an electrical line to an electronic power distribution arrangement, the method comprising the steps of:
    arranging a first electronic switch having a first switchable current path between a first load terminal and a second load terminal of the first electronic switch, wherein the electrical line is connected to the first load terminal of the first electronic switch, and wherein the second load terminal of the first electronic switch is connected to a power supply so as to provide power to the capacitive load;
    arranging a second electronic switch having a second switchable current path between a first load terminal and a second load terminal of the second electronic switch;
    connecting a resistor in series with the second switchable current path of the second electronic switch, wherein the series connection of the resistor with the second electronic switch is connected in parallel with the first switchable current path of the first electronic switch turning on the second electronic switch to precharge the capacitive load before turning on the first electronic switch;
    detecting a voltage across the resistor; and
    turning on the first electronic switch when the sensed voltage across the resistor reaches a threshold value.

* * * * *